United States Patent [19]

Sakashita

[11] Patent Number: 5,226,097
[45] Date of Patent: Jul. 6, 1993

[54] IMAGE RECOGNIZER AND METHOD FOR RECOGNIZING IMAGE

[75] Inventor: Tadaaki Sakashita, Kawasaki, Japan

[73] Assignee: Ricoh Company, Ltd., Tokyo, Japan

[21] Appl. No.: 699,446

[22] Filed: May 13, 1991

[30] Foreign Application Priority Data

Sep. 27, 1990 [JP] Japan .................. 2-259728

[51] Int. Cl.⁵ .......................... G06K 9/80
[52] U.S. Cl. .......................... 382/61; 382/9; 382/54; 358/463
[58] Field of Search .......... 382/61, 46, 54, 9; 358/447, 463, 462; 235/456, 437

[56] References Cited

U.S. PATENT DOCUMENTS

| 4,153,895 | 5/1979 | Weisbrod et al. | 235/456 |
| 4,300,123 | 11/1981 | McMillin et al. | 382/61 |
| 4,357,596 | 11/1982 | Feilchenfeld | 235/456 |
| 4,533,959 | 8/1985 | Sakurai | 382/46 |
| 4,633,507 | 12/1986 | Cannistra et al. | 382/46 |
| 4,686,704 | 8/1987 | Kamada et al. | 382/61 |
| 4,941,170 | 7/1990 | Herbst | 358/440 |
| 4,941,184 | 7/1990 | Sato | 382/61 |
| 5,048,096 | 9/1991 | Beato | 382/54 |

FOREIGN PATENT DOCUMENTS 53-26945  8/1978  Japan .

Primary Examiner—David K. Moore
Assistant Examiner—David Fox
Attorney, Agent, or Firm—Oblon, Spivak, McClelland, Maier & Neustadt

[57] ABSTRACT

An image recognizer which recognizes an image signal representing a mark on a mark sheet which has been written in a predetermined format judges whether or not the image signal may be considered to be constituted in accordance with the predetermined format, and recognize only the image signal which is judged to be constituted in accordance with the predetermined format.

10 Claims, 17 Drawing Sheets

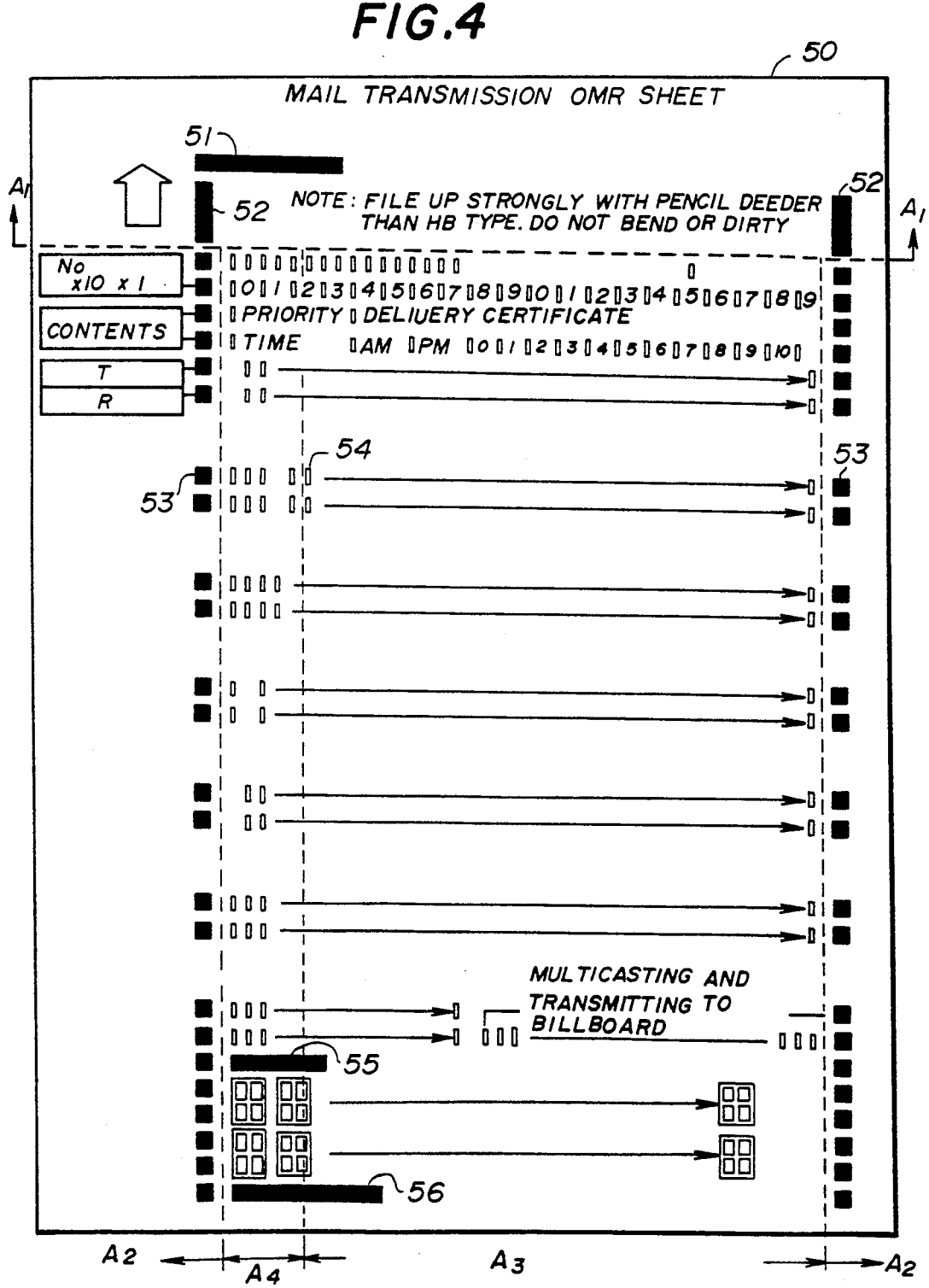

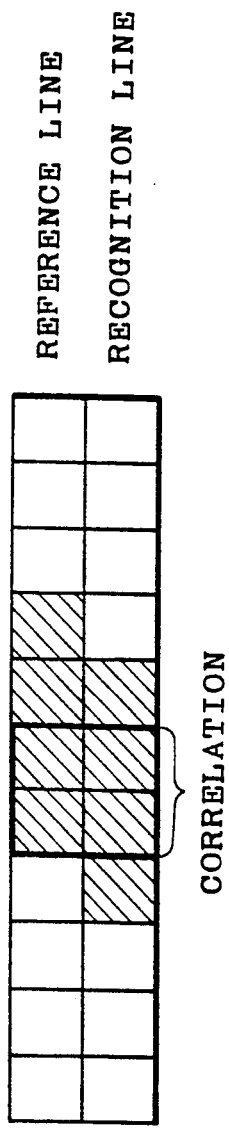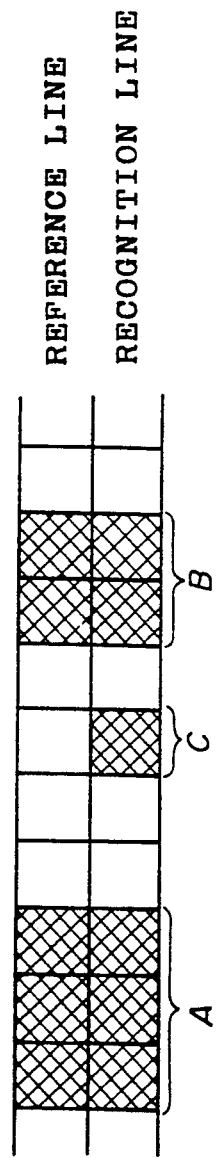

FIG.8

|  | $K \leq K0$ | $K0 < K < K1$ | $K1 \leq K$ |
|---|---|---|---|
| $X < X0$ | NO MARK | REJECT | MARK |
| $X \geq X0$ | REJECT | REJECT | REJECT |

FIG.10A   FIG.10B   FIG.10C FIG.10D
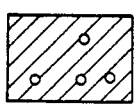  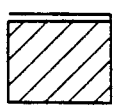  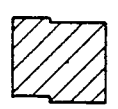  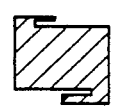
FIG.11
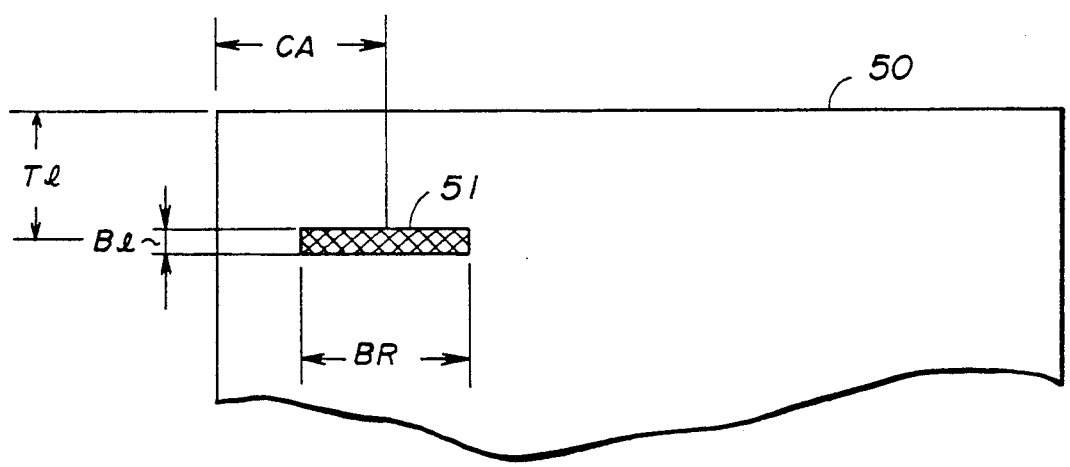

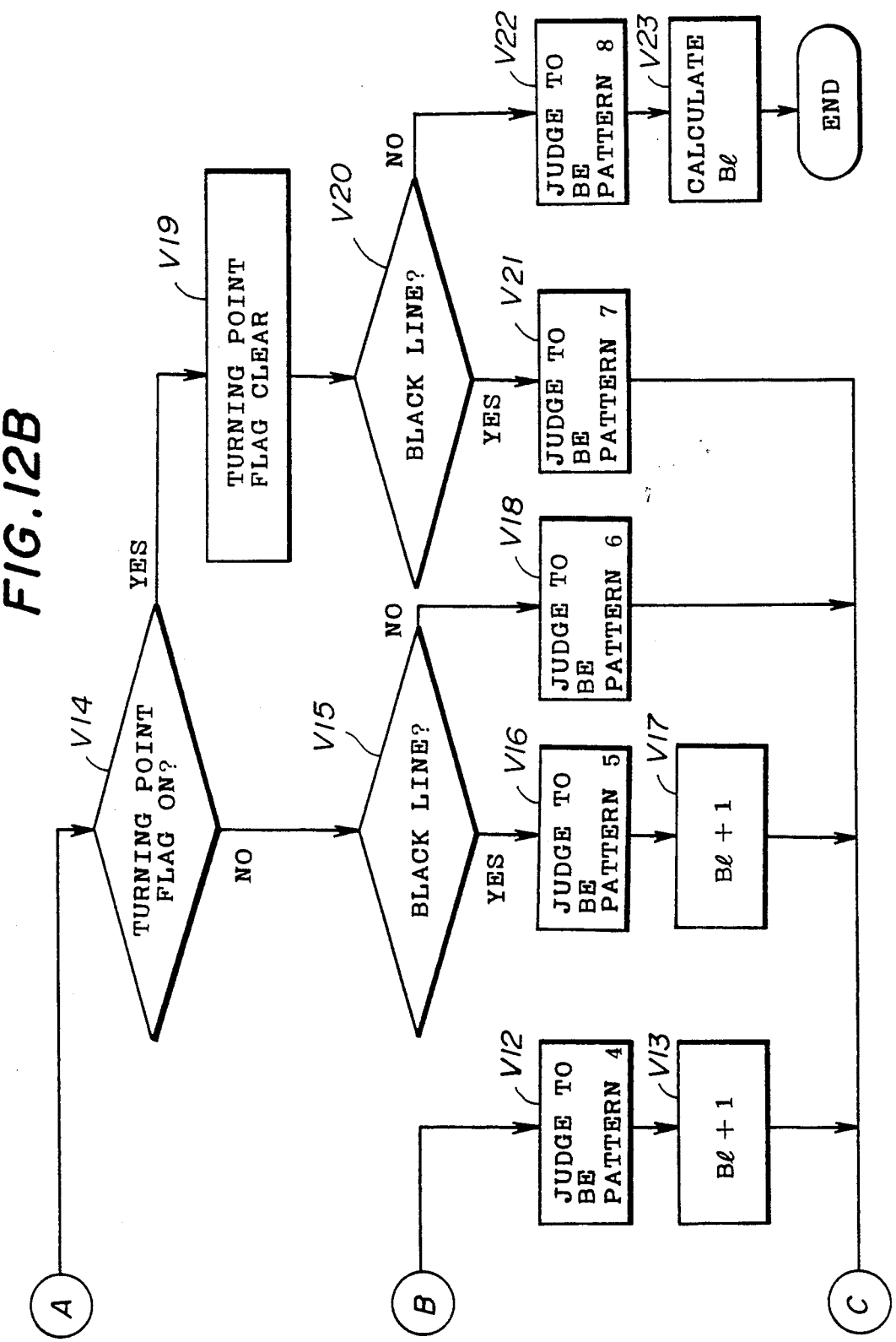

PATTERN1 PATTERN2 PATTERN3 PATTERN4 PATTERN5 PATTERN6 PATTERN7 PATTERN8

| θ | X₀ | Z₀ | X₀/Z₀ |
|---|---|---|---|
| 0° | 61.6 | 61.6 | 1 |
| 0.1° | . | . | . |
| 0.2° | . | . | . |
| . | . | . | . |
| . | . | . | . |
| . | . | . | . |

FIG. 19

| HOW TO DRAW / K0 | 2mm/MIN (7.7line) | 3mm/MIN (11.55line) | 4mm/MIN (15.4line) |
|---|---|---|---|
| 8 | JUDGE IT IMPOSSIBLE TO RECOGNIZE | max.3.55line | max.7.4line |
| 10 | → | max.1.55line | max.5.4line |
| 12 | → | JUDGE IT IMPOSSIBLE TO RECOGNIZE | max.3.4line |

5,226,097

IMAGE RECOGNIZER AND METHOD FOR RECOGNIZING IMAGE

BACKGROUND OF THE INVENTION

The present invention relates generally to image recognizers and methods for recognizing an image, and more particularly to an apparatus for recognizing an image signal representing a mark on a mark sheet which has been written in a predetermined format, the image signal being transmitted thereto via a line network, and a method for recognizing such a mark. The present invention is applicable to an apparatus for recognizing a handwritten mark transmitted from a group 3 (abbreviated G3 hereinafter) facsimile apparatus via a telephone line.

Recently, a facsimile apparatus (abbreviated FAX hereinafter) serving as a mark reader has been proposed by Japanese Patent Publication No.53-26945. According to the reference, the FAX, operatively interconnected to a line network, reads and transmits a mark on a mark sheet. Since the FAX serves as a mark reader, no additional mark reader, such as an optical mark reader (abbreviated OMR hereinafter), is needed for reading the mark, so that the mark can be inexpensively transmitted.

However, the above method for transmitting the mark has a disadvantage in that a communicatee terminal to which the mark is transmitted from the FAX cannot always accurately recognize the mark because of the deteriorated quality of the mark. Hereupon, the quality of the mark is affected by the scale, line width and density of the mark, a rumbling of and dirt on the mark sheet, chattering at interfaces of a transmitter and/or receiver, and noises generated during the data transmission.

SUMMARY OF THE INVENTION

Accordingly, it is a general object of the present invention to provide a novel and useful image recognizer and a method for recognizing an image in which the above disadvantage is eliminated.

Another object of the present invention is to provide a precise image recognizer and a method for precisely recognizing an image.

According to one feature of the present invention, an image recognizer which recognizes an image signal representing a mark on a mark sheet which has been written in a predetermined format, the image signal being transmitted to the image recognizer, comprises judging means for judging whether or not the image signal may be considered to be constituted in accordance with the predetermined format, and recognizing means, coupled to the judging means, for recognizing only the image signal which is judged to be constituted in accordance with the predetermined format by the judging means.

According to another feature of the present invention, a method for recognizing an image signal representing a mark on a mark sheet which has been written in a predetermined format comprises the steps of judging whether or not the image signal may be considered to be constituted in accordance with the predetermined format, and recognizing only the image signal which is judged to be constituted in accordance with the predetermined format.

According to the present invention, only the image which is judged to be constituted in accordance with the predetermined format is recognized.

Other objects and further aspects of the present invention will become apparent from the following detailed description when read in conjunction with the accompanying drawings.

BRIEF DESCRIPTION OF THE DRAWINGS

FIG. 4 shows an example of a mark sheet to be transmitted to the mark sheet recognition processor shown in FIG. 1;

FIGS. 6 and 7 shows a relationship between a reference line and a recognition line;

FIG. 8 shows a table by which the central processing unit judges the presence of an information mark on the mark sheet shown in FIG. 4;

FIGS. 9 and 10A-10D respectively show examples of abnormal images on the mark sheet shown in FIG. 4;

FIG. 11 shows the scale of a start mark on the mark sheet shown in FIG. 4;

FIGS. 12A and 12B show a flowchart executed by the central processing unit shown in FIG. 3 to compensate a chattering;

FIG. 19 shows a relationship between an allowable number of erroneous lines and the width of a mark.

DESCRIPTION OF THE PREFERRED EMBODIMENTS

Figure 1:
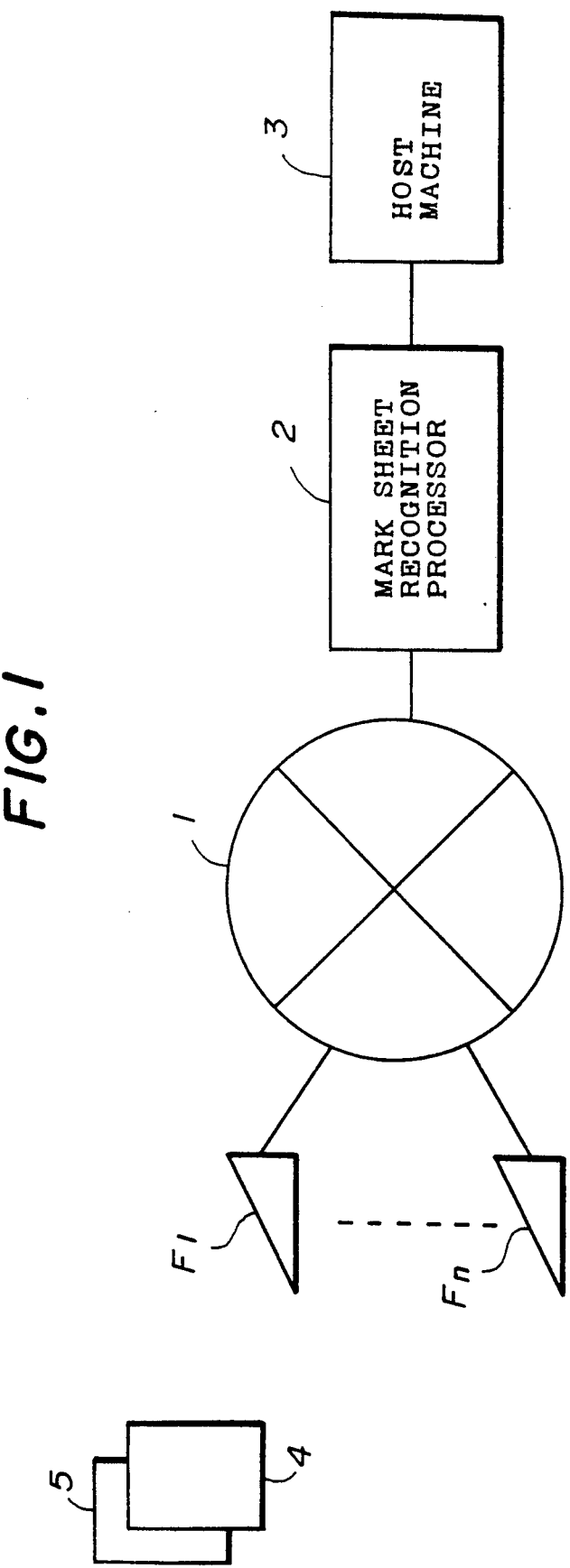
FIG. 1 shows an example of a communication system comprising a mark sheet recognition processor according to the present invention.

A communication system shown in FIG. 1 comprises a line network 1, such as a telephone network, a mark sheet recognition processor 2 according to the present invention and a host machine 3. A plurality of FAXs F1 to Fn, such as G3 FAXs, and the mark sheet recognition processor 2 are respectively connected to the line network 1. The mark sheet recognition processor 2 is further operatively interconnected to the host machine 3. The mark sheet recognition processor 2 may be combined with the host machine 3. In addition, the mark sheet recognition processor 2 may be a FAX.

The FAXs F1 to Fn respectively transmit an image data to the mark sheet recognition processor 2 via the line network 1. Each FAX, serving as a mark reader disclosed by the aforementioned reference No.

53-26945, comprises a scanner, an encoder/decoder, a memory and a plotter. The scanner scans a predetermined image on a manuscript 4 and a mark sheet 5 to generate an image signal for every line. The encoder/decoder encodes the image signal into an image data and decodes the image data into the image signal by a modified huffman (abbreviated MH hereinafter) method, a modified read (abbreviated MR hereinafter) method or the like. The memory stores an image data therein, and the plotter prints out an image.

Figure 2:
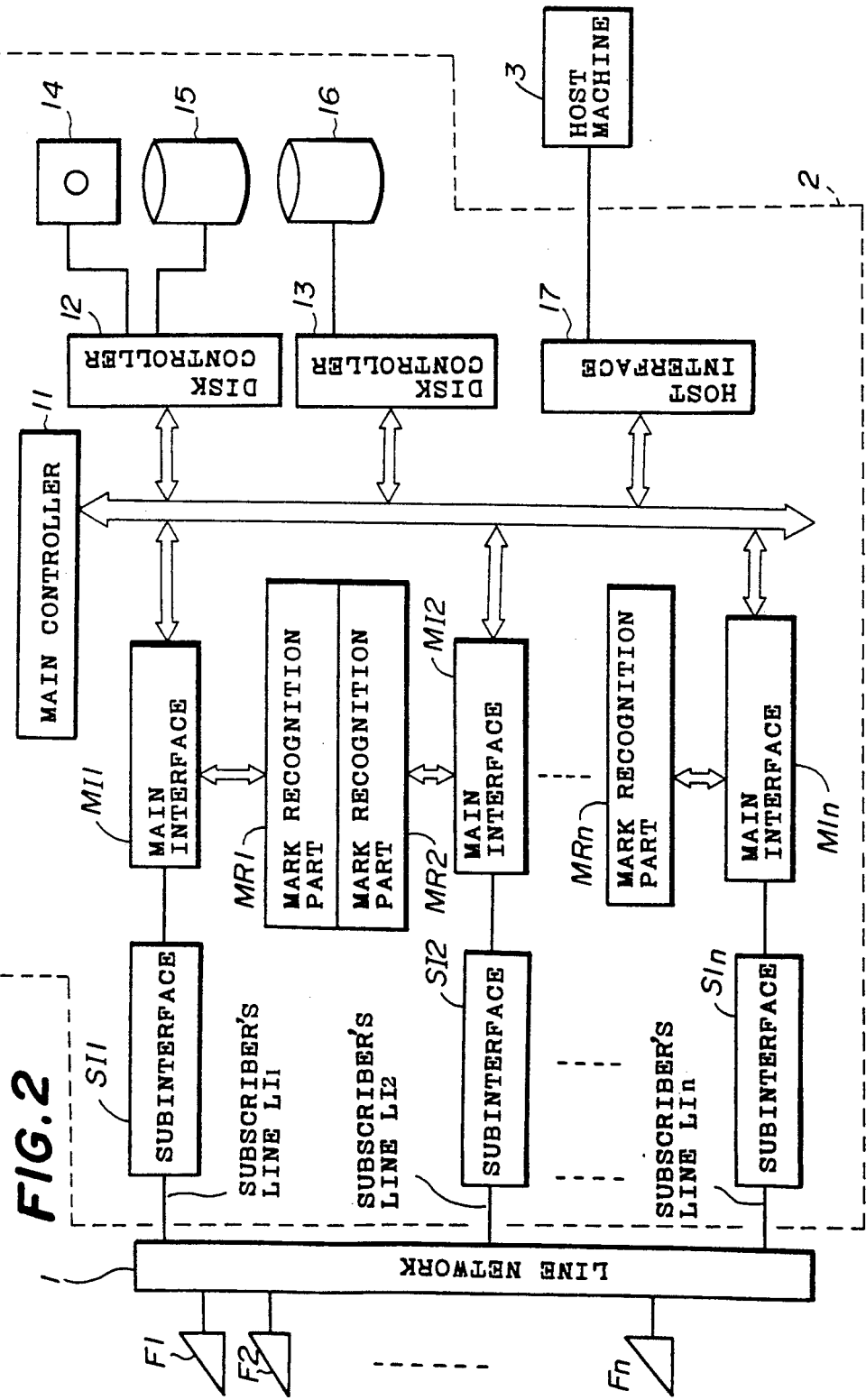
FIG. 2 shows a block diagram for explaining an example of a construction of the mark sheet recognition processor shown in FIG. 1.

The mark sheet recognition processor 2 according to the present invention recognizes and processes the image data transmitted from one of the FAXs F1 to Fn. The mark sheet recognition processor 2 is controlled by the host machine 3. The mark sheet recognition processor 2 comprises, as shown in FIG. 2, a main controller 11, main interfaces $MI_1$ to $MI_n$, subinterfaces $SI_1$ to $SI_n$, mark recognition parts $MR_1$ to $MR_n$, disk controllers 12 and 13, a so-called floppy disk 14, hard disks 15 and 16, and a host interface 17. The main controller 11, main interfaces $MI_1$ to $MI_n$, disk controllers 12 and 13, and host interface 17 are operatively interconnected to each other via a bus. Each of the main interfaces $MI_1$ to $MI_n$ is further connected to a corresponding one of the subinterfaces $SI_1$ to $SI_n$ and a corresponding one of the mark recognition parts $MR_1$ to $MR_n$. Each of the subinterfaces $SI_1$ to $SI_n$ is further connected to a line network 1 via a corresponding one of subscriber's lines $LI_1$ to $LI_n$. The disk controller 12 is operatively interconnected to the floppy disk 14 and the hard disk 15. The disk controller 13 is connected to the hard disk 13. The host interface 17 is connected to the host machine 3.

The main controller 11 controls each part of the mark sheet recognition processor 2 in accordance with various programs stored in the floppy disk 14 and/or the hard disks 15 and 16.

Each of the main interfaces $MI_1$ to $MI_n$ comprises a communication controller, an encoder/decoder, a buffer memory, and the like. Each main interface controls the communication between this mark sheet recognition processor 2 and a corresponding one of the FAXs F1 to Fn in accordance with a predetermined protocol. In addition, each main interface decodes an image data transmitted thereto into an image signal.

Each of the subinterfaces $SI_1$ to $SI_n$ has a modem and a communication controller controlled by the corresponding main interface. Each subinterface controls the connection between the line network 1 and the corresponding one of the main interfaces $MI_1$ to $MI_n$. In addition, each subinterface modulates and/or demodulates a signal transmitted from one of the FAXs F1 to Fn.

The disk controller 12 controls the operating of the floppy disk 14 and the hard disk 15, and the disk controller 13 controls the operating of the hard disk 16. The floppy disk 14 and hard disks 15 and 16 respectively store various programs and data used for the operating of the mark sheet recognition processor 2. The hard disks 15 and 16 can temporarily store the image data to be transmitted from the host machine 3 to one of the FAXs F1 to Fn.

The host interface 17 has a communication controller and controls the communication between the host machine 3 and this mark sheet recognition processor 2.

Figure 3:
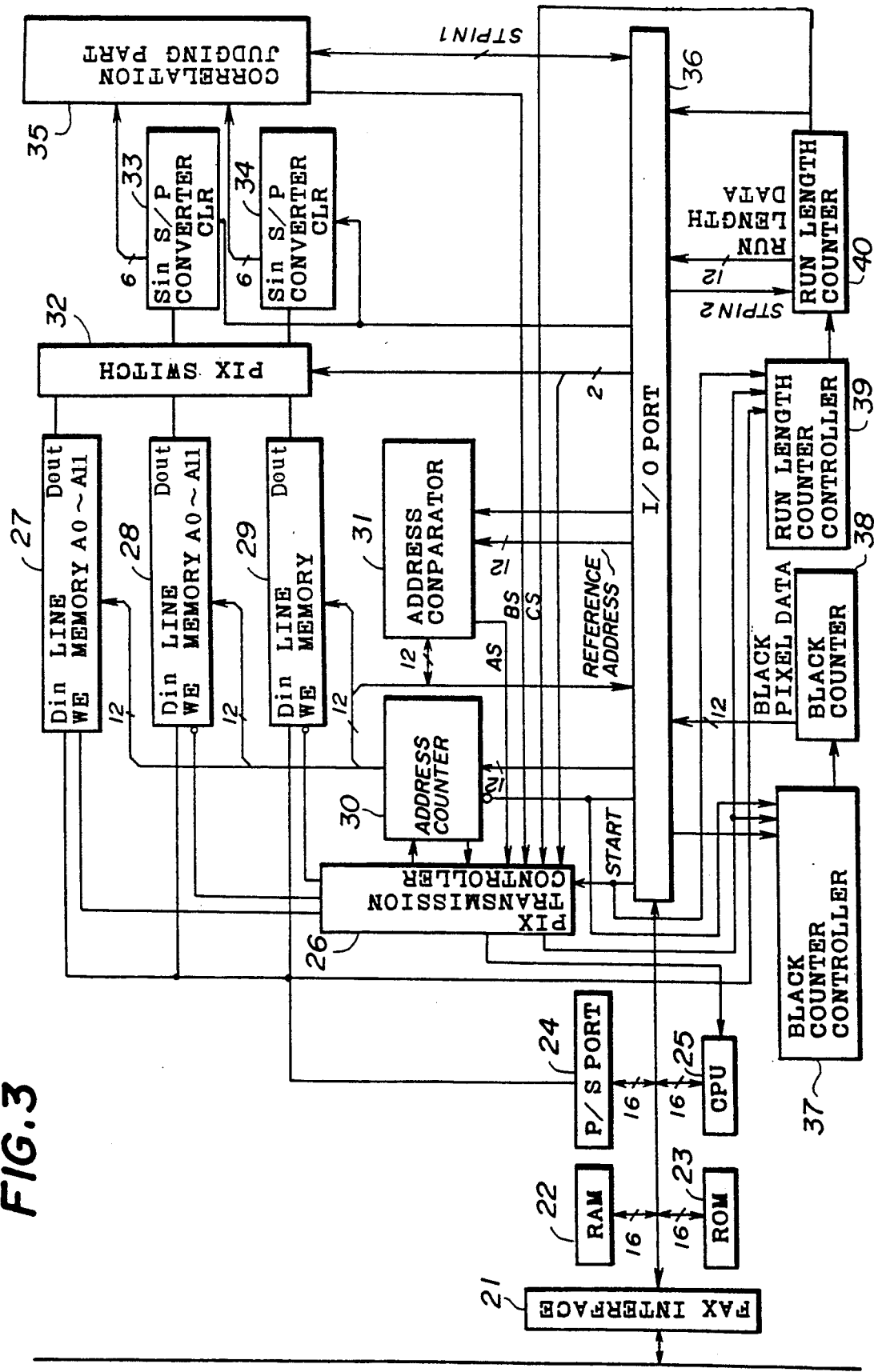
FIG. 3 shows a block diagram for explaining an example of a construction of a mark recognition part in the mark recognition processor shown in FIG. 2.

Each of the mark recognition parts $MR_1$ to $MR_n$ recognizes and processes a mark transmitted from one of the FAXs F1 to Fn thereto. Each mark recognition part comprises, as shown in FIG. 3, a FAX interface 21, a random access memory (abbreviated RAM hereinafter) 22, a read only memory (abbreviated ROM hereinafter) 23, a parallel to serial (abbreviated P/S hereinafter) port 24, a central processing unit (abbreviated CPU hereinafter) 25, a PIX transmission controller 26, line memories 27 to 29, an address counter 30, an address comparator 31, a PIX switch 32, serial to parallel (abbreviated S/P hereinafter) converters 33 and 34, a correlation judging part 35, an input/output (abbreviated I/O hereinafter) port 36, a black counter controller 37, a black counter 38, a run length counter controller 39, and a run length counter 40. The FAX interface 21, RAM 22, ROM 23, P/S port 24, CPU 25 and I/O port 36 are connected with each other via a bus. The PIX transmission controller 26, address counter 30, address comparator 31, PIX switch 32, S/P converters 33 and 34, correlation judging part 35, black counter controller 37, black counter 38, run length counter controller 39, and run length counter 40 are respectively coupled to the I/O port 36. The PIX transmission controller 26 is further connected to the CPU 25, line memories 27 to 29, address counter 30, address comparator 31, correlation judging part 35, black counter controller 37, run length counter controller 39 and run length counter 40. The line memories 27 to 29 are respectively further coupled to the address counter 30, PIX switch 32, black counter controller 37 and run length counter controller 39. The address counter 3 is further coupled to the address comparator 31. The S/P converters 33 and 34 are respectively further coupled to the PIX switch 32 and correlation judging part 35. The black counter controller 37 is further coupled to the black counter 38. The run length counter controller 39 is further coupled to the run length counter 40.

The FAX interface 21 controls the connecting of this mark recognition part to a corresponding one of the main interfaces $MI_1$ to $MI_n$. The RAM 22 temporarily stores an image signal transmitted from the corresponding main interface. The ROM 23 stores various programs used for the operation of this mark recognition processor. The various programs include a table used for detecting a gradient angle of the mark sheet 5 which will be described later. The P/S port 24 converts a parallel data into a serial data. The image signal is transmitted from the RAM 22 to the P/S port 24 by means of the direct memory access (abbreviated DMA hereinafter) transmission method. The P/S port transmits the image signal to the line memories 27 to 29 and the black counter controller 37, and the run length counter controller 39. The CPU 25 executes a sequence control for each part of this mark recognition processor and performs a mark recognition process according to the present invention.

The PIX transmission controller 26 controls the transmitting of the image signal. The PIX transmission controller 26 outputs a WE signal used for a timing of a writing to the line memories 27 to 29. In addition, the PIX transmission controller 26 outputs a request signal to the CPU 25 and asks it to instruct the RAM 22 to transmit the image signal to the P/S port 24. Moreover, the PIX transmission controller 26 outputs a signal used for a timing of the count control to the black counter controller 37 and the run length counter 39. The PIX transmission controller 26 starts to operate in response to a start signal transmitted from the CPU 25 via the I/O port 36, and it stops operating in response to either an address stop instruction transmitted from the address comparator 31, a correlation stop instruction transmitted from the correlation judging part 35 or a run length stop instruction transmitted from the run length counter 40 which will be described later.

Each of the line memories 27 to 29 stores an image signal for every line. One of the line memories 27 to 29 is used as a first line memory which stores a line of image signal. Another one of the line memories 27 to 29 is used as a second line memory which stores a recognition line, and still another on of the line memories 27 to 29 is used as a third line memory which stores a reference line. Hereupon, the term "preprocess", as used herein, means a process for detecting the control marks, such as a start mark 51, gradient correction marks 52, timing marks 53, a mode switch mark 55, and a end mark 56 on the mark sheet 50, which will be described later with reference to FIG. 4 and for removing an abnormal mark which is generated by the noises, chattering, dirt etc. On the other hand, the term "recognition process", as used herein, means a process to recognize and execute a predetermined procedure for information marks 54 on the mark sheet 50, which will be described later with reference to FIG. 4. Each of the line memory 27 to 29 is used as one of the first, second and third memories in turn. The line memory which is used as the first line memory will be used as the second line memory, and then will be used as the third line memory.

The address counter 30 designates a writing address of the image signal to be transmitted from the P/S port to the line memories 27 to 29 and a reading address of the image signal to be transmitted from the line memories 27 to 29 to the S/P converters 33 and 34 via the PIX switch 32. The address counter 30 supplies the address data representing the above writing address and reading address to the address comparator 31, and the correlation judging part 35 and the run length counter 40 via the I/O port 36.

The address comparator 31 compares a reference address supplied from the I/O port 36 with the address data (real address) supplied from the address counter 30, and outputs the address stop instruction (referred to as AS hereinafter) to the PIX transmission controller 26 and the CPU 25 via the I/O port 36. Hereupon, the reference address indicates an address of a border between areas on a mark sheet which will be described below. The AS is used for switching from the preprocess to the recognition process. The operation of the address comparator 31 is controlled by the CPU 25 via the I/O port 36.

A description will now be given of the reference address with reference to FIG. 4. As mentioned above, the reference address is an address of a border between the areas on a mark sheet. As shown in FIG. 4, the mark sheet 50, which is a mail transmission mark sheet, comprises the start mark 51, the gradient correction marks 52, the timing marks 53, the information marks 54, the mode switch mark 55 and the end mark 56. Each mark except for the information marks 54 is to be printed in black. The mail transmission mark sheet 50 is used when an operator of one of the FAXs F1 to Fn requests the host computer 3 to transmit the manuscript 4 thereto. A transmitter (abbreviated "T" in FIG. 4), a receiver (abbreviated "R" in FIG. 4), the time designation (abbreviated "TIME" in FIG. 4), or the like are inputted by filling up a predetermined information mark 54. Since the timing marks 53 are provided at both sides of the respective mode switch mark 55 and both sides of the end mark 56, a gradient angle of the mark sheet 50 can be precisely detected even in the vicinity lines of the mode switch mark 55 and the end mark 56. The mark sheet 50 is segmented into preprocess areas $A_1$ and $A_2$, a recognition process area $A_3$ and an area $A_4$. In every line of the areas $A_1$ and $A_2$, only the preprocess is performed. In every line of the area $A_3$, the recognition process is generally performed. But in every line of the area $A_4$, both the preprocess and recognition process are preformed. Thus, since the mark sheet 50 is conveniently segmented for the preprocess and the recognition process, the mark recognition part can recognize the mark sheet in a relatively short time. An addresses of a border between the areas $A_2$ and $A_4$, of one between the areas $A_4$ and $A_3$, and of one between the areas $A_3$ and $A_2$ are each respectively referred to as the reference address. Thus, the address comparator 31 compares the above reference address with the real address to be outputted to the line memories 27 to 29 in order to detect the position of the border. Incidentally, in this embodiment, the respective positions of the mode switch mark 55 and the end mark 56 are determined by the (left) timing marks 53, and the mode switch mark 55 and the end mark 56 respectively cross the areas $A_4$ and $A_3$.

In FIG. 3, the PIX switch 32 selects two line memories and outputs the respective image signal stored in each of the two line memories to the respective S/P converters 33 and 34. One image signal to be transmitted to the S/P converter 34 is referred to as a recognition image signal, and the other image signal to be transmitted to the S/P converter 33 is referred to as a reference image signal. Moreover, the recognition line denotes a line of the recognition image signal, and the reference line denotes a line of the reference image signal. One line is shifted between the recognition line and the reference line and between a line which is written down in the first line memory and the recognition line. That is, if the line memory 27 is used as the first line memory, the line memory 28 is used as the second line memory, and the line memory is used as the third line memory, a line written down in the line memory 27 is subsequent line which will become the reference line next time. In addition, the reference line is a line subsequent to the recognition line. The S/P converters 33 and 34 convert a serial data into a parallel data. Each of the S/P converters 33 and 34 may be a shift register.

The correlation judging part 35, controlled by a signal STPIN1 transmitted from the CPU via the I/O port 36, filters out dirt and/or spots on the mark sheet 50 and/or noises generated during the data transmission to precisely recognize the image signal. The correlation judging part 35 compares the recognition line with the reference line for every picture element (abbreviated pixel hereinafter) and judges whether or not the recognition line is drawn in black by means of a 2*2 matrix comprising, as shown in FIG. 6, two pixels in the recognition line and two pixels in the reference line. Dirt, spots, rumbles or drop-out color on the mark sheet 50 and/or noises are outputted as a black pixel having less than 1 dot, as shown in FIG. 7C. Therefore, if all four pixels are black, the correlation judging part 35 judges them to be correlated and outputs the correlation stop instruction (referred to as BS hereinafter) to the PIX transmission controller 26 and the CPU 25 via the I/O port 36. If the correlation continues for a number of lines more than a predetermined threshold, the correlation judging part 35 judges that there is a mark drawn in black.

The black counter controller 37 judges whether a line of image signal is black or white. In addition, the black counter controller 37 controls the black counter 38.

The black counter 38 counts the number of the black pixels included in the line of the image signal, and outputs a black pixel data representing the number to the CPU via the I/O port 36. Thanks to the black counter 38, an abnormal line including extra black pixels generated by the noises etc. can be removed.

The run length counter controller 39 is used for a page of a preprocess and a line of a preprocess. The run length counter controller 39 judges whether a line of the image signal is black or white.

The run length counter 40, controlled by a signal STPIN2 transmitted from the CPU via the I/O port 36, counts a run length of the black pixel included in the line of the image signal. The run length counter 40 outputs a run length data representing the run length of the black pixel to the CPU 25 via the I/O port 36 and outputs the run length stop instruction (referred to as CS hereinafter) to the PIX transmission controller 26.

In operation, when an operator of one of the FAXs F1 to Fn transmits the mark sheet 5 to the host computer 3 in order to request it to transmits the manuscript 4 thereto, the mark sheet 5 is first scanned and transmitted to the mark sheet recognition processor 2 via the line network 1. But an interface of the FAX sometimes chatters, and in addition, the image on the mark sheet 5 is partially reduced and/or enlarged during the scanning. Moreover, even dust and/or spots which often get attached to the mark sheet 5 and a drop-out color thereon are sometimes scanned. Therefore, the quality of the mark is sometimes lowered.

The image data representing the mark sheet 5 is inputted into one of the main interfaces $MI_1$ to $MI_n$ via the corresponding subscriber's line and subinterface. Then, the image data is encoded again by the encoder/decoder in the main interface, and transmitted to a corresponding one of the mark recognition parts $MR_1$ to $MR_n$.

Firstly, the image signal is transmitted to the RAM 22 via the FAX interface 21. When the PIX transmission controller 26 transmits the request signal to the CPU 25, the CPU 25 instructs the RAM 22 to transmit the stored image signal to the P/S port 24 by means of the DMA transmission. The parallel image signal is converted into the serial signal by the P/S port 24 and written in one of the line memories 27 to 29. In addition, the image signal is transmitted to the black counter controller 37 and the run length counter controller 39. The black counter controller 37 and the black counter 38, and run length counter controller 39 and the run length counter 40, respectively preprocess every line of the image signal.

A description will now be given of the preprocess executed by the black counter controller 37 and the black counter 38 and the run length counter controller 39 and the run length counter 40. Hereupon, the image signal is segmented into four areas $A_1$ to $A_4$, as mentioned above. Firstly, the start mark 51 and the gradient correction mark 52 are detected from the image signal at the preprocess area $A_1$ to judge whether or not the mark sheet has been inserted in a correct direction (without being up side down) and whether or not the mark sheet has an allowable initial gradient limit. Only a normal line of the image signal at the preprocess area $A_1$ is used for the preprocess. Therefore, the CPU 25 first judges whether every line of image signal is normal or abnormal based on the black pixel data transmitted from the black counter 38. The CPU 25 judges a line to be abnormal when the number of the black pixels exceeds a predetermined threshold. Whether or not a line is normal depends on the quality of the mark. If the CPU 25 judges a line to be abnormal, it rejects examining the line, so that abnormal lines are not used. The CPU 25 instructs the run length counter 39 to process only normal lines. The run length counter 40 detects the start mark 51 and the gradient correction marks 52, and thus the CPU 25 judges whether or not the mark sheet has been inserted in a correct direction and whether or not the mark sheet has the allowable initial gradient limit.

Figure 5A:
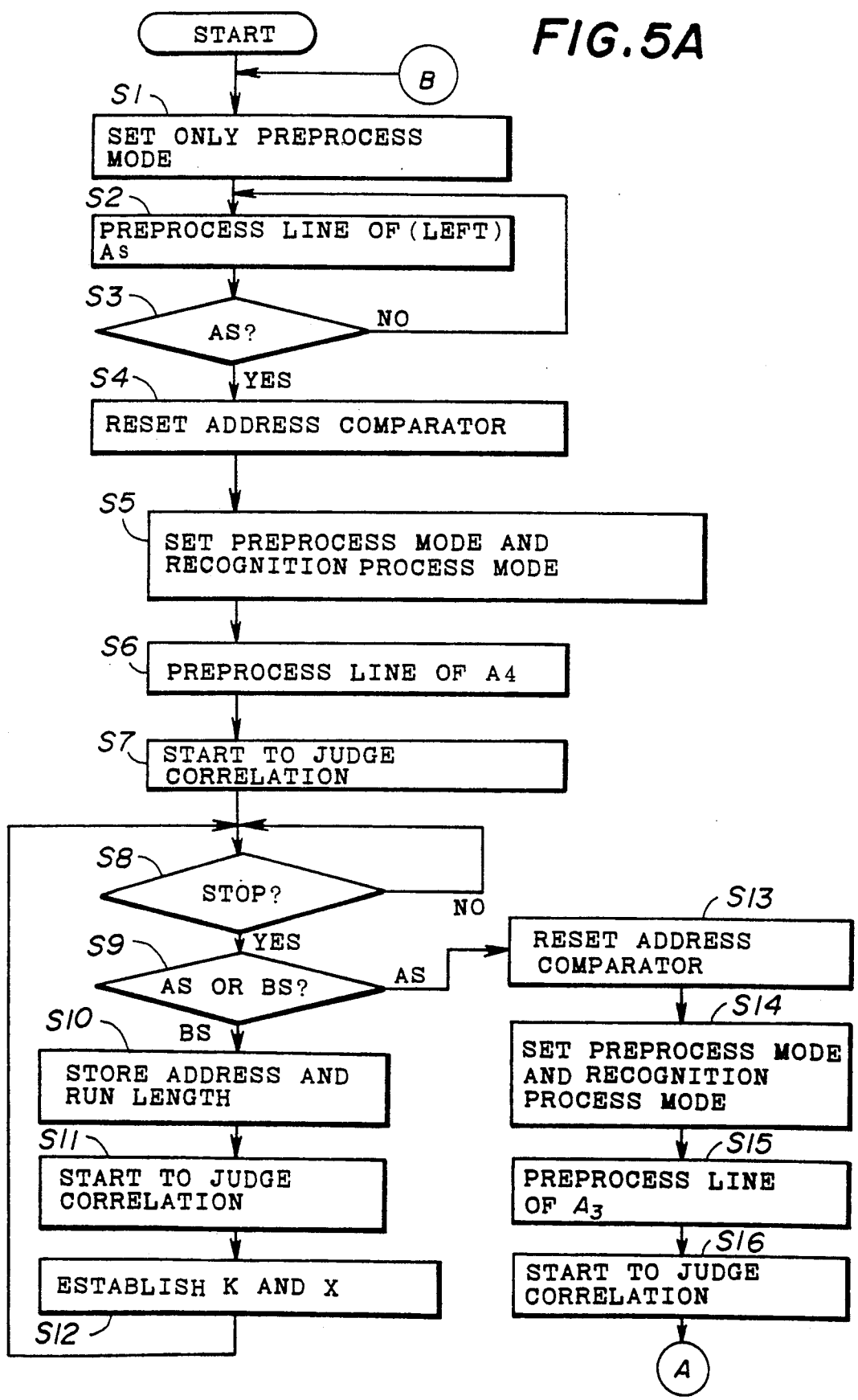
FIGS. 5A and 5B show a flowchart executed by a central processing unit shown in FIG. 3 to extract a normal image.
Figure 5B:
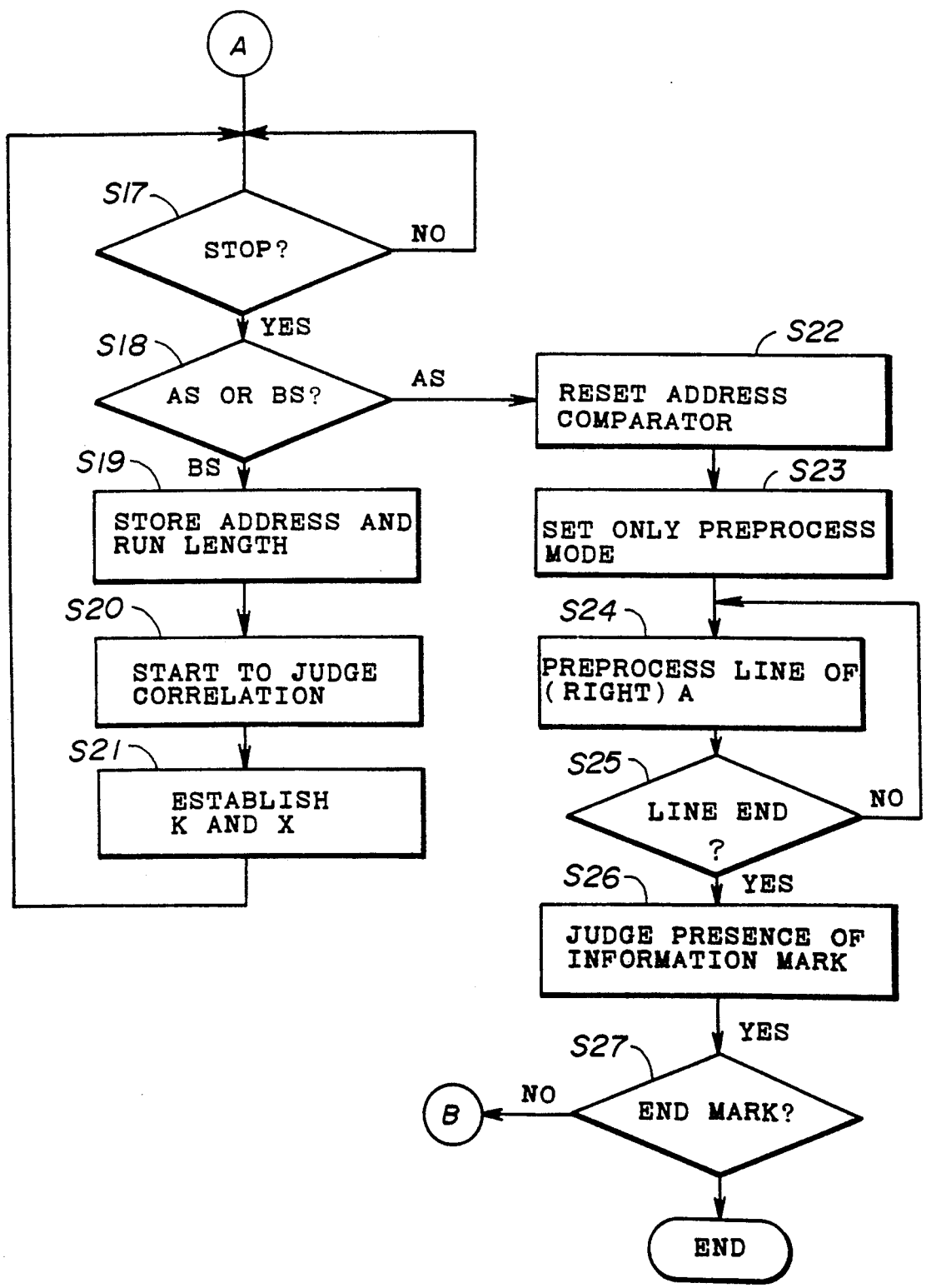
Figure 9:
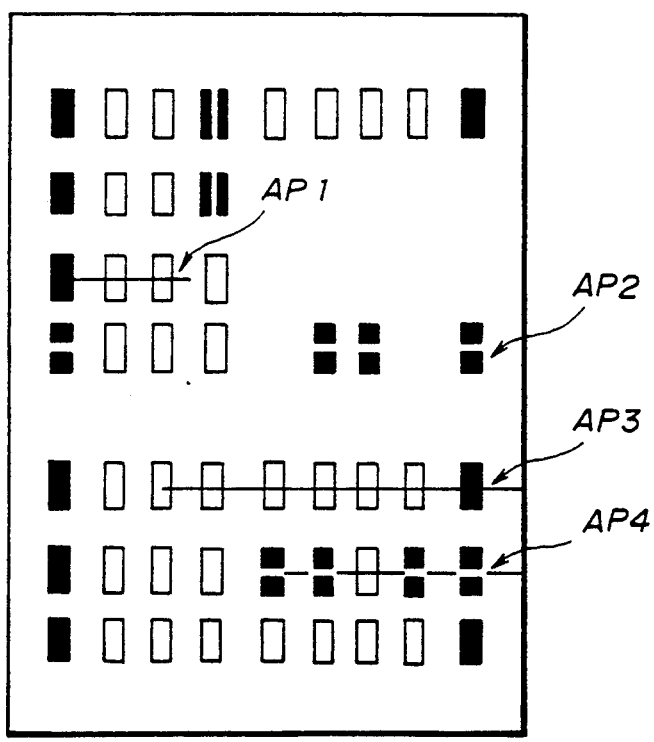

Secondly, the preprocess and the recognition process are performed for the areas $A_2$ to $A_4$ by the CPU 25 in accordance with the flowchart shown in FIG. 5 if it judges that the mark sheet 50 has been inserted in a correct direction and has the allowable initial gradient limit. The CPU 25 initially sets only a preprocess mode, in which only the preprocess is performed, by transmitting the STPIN1 and STPIN2 so that the correlation judging part 35 can operate and the run length counter 40 cannot operate (in step 1). This preprocess is performed to detect the (left) timing marks 53. Initially, the address of the border between the areas $A_2$ and $A_4$ is set in the reference address of the address comparator 31. Subsequently, the CPU 25 transmits the start signal to the PIX transmission controller 26 via the I/O port 36, and in response the P/S port 24 transmits the WE signal to one of the line memories 27 to 29. Consequently, the black counter controller 37 and the black counter 38, and the run length counter controller 39 and the run length counter 40, respectively preprocess the line of (left) area $A_2$ (in step S2). When the preprocess reaches the border between the areas $A_2$ and $A_4$, the address comparator 31 outputs the AS to the PIX transmission controller 36 and the CPU 25. In response, the CPU 25 resets the address of the border between areas $A_4$ and $A_3$ in the reference address on the address comparator 31 (in steps S3 and S4). At the same time, the CPU 25 stores the data regarding the detected timing mark 53. Incidentally, if the CS is transmitted to the PIX transmission controller 26, the CPU 25 stores the address and the run length of the pixel by which the CS is generated. The address and the run length are used for detecting an abnormal image. Each timing mark 53 is formed to have a predetermined width, nevertheless, if the run length of the black pixel thereof is longer than the predetermined width, it may be considered that the abnormal AP1 image shown in FIG. 9 has been generated. On the contrary, it may be considered that the abnormal image shown in any one of FIGS. 10A to 10D is generated in a case where the run length is not detected at the address at which the black pixel of each of the timing marks 53 is to be present. In this case, the CPU 25 removes the abnormal image by means of establishing the parameter K and X which are described later.

Next, the CPU 25 sets the preprocess mode and a recognition process mode by transmitting the STPIN1 and STPIN2 (in step S5). Because of the both modes, the recognition process as well as the preprocess mode can be performed. Thus, the preprocess is performed for the line of area $A_4$ to detect the mode switch mark 55 and the end mark 56 (in step S6). For example, when the area $A_4$ has a width of 20 mm, the mode switch mark 55 has a length of about 17.5 mm. If the CPU 25 detects the mode switch make 55, it sets a switch mark flag on. On the other hand, when the CS is transmitted to the PIX transmission controller 26, the CPU 25 checks whether the switch mark flag is set on or off and stores the address and run length of the pixel by which the CS is generated. Then the correlation judging part 35 starts to judge the correlation at the preprocessed line to detect information marks 54 (in step S7). If the BS is transmitted to the CPU 25, it stores the address and the run length of the pixels which have been judged to be the correlation (in step S10). Then the correlation judging part 35 starts to judge the correlation again (in step S11) to deal with the subsequent pixels A and C shown in FIG. 7 which are to be judged as the correlation.

After the step S11, the CPU 25 establishes parameters K and X (in step S12). These parameters are established after the location of the pixels which have been judged to be the correlation is checked. The parameter K is referred to as a correlation parameter which is used for judging the presence of the information marks 54, and the parameter X is referred to as a reject parameter which is used for rejecting the dust or spot on the mark sheet 50. Initially, these parameters are each respectively "0". These parameters are established in accordance with the following rules:

1. "1" is added to K while X is maintained as it is when all the following terms have been satisfied.

(1) The correlation between a certain reference line and the prior line has been judged.

(2) The correlation between the reference line and the recognition line has been judged.

(3) The center address of the pixels at which the correlation (2) has been judged can be present within addresses on the information marks 54.

2. K and X are maintained as they are when all the following terms have been satisfied.

(1) The correlation between a reference line and the prior line has not been judged.

(2) The correlation between the reference line and the recognition line has not been judged.

(3) There are not more than two black pixels on the reference line.

3. "2" is added to K while X is maintained as it is when all the following terms have been satisfied.

(1) K and X continue to be maintained as they have been in accordance with the above rule 2.

(2) The correlation between the reference line and the recognition line has been judged.

(3) The center address of the pixels at which the correlation (2) has been judged can be present within addresses on the information marks 54.

4. "1" is added to X while K is maintained as it is when all the above rules 1 to 3 cannot be applied.

As is apparent from the above rules 1 to 4, the parameter K is used for counting the length in a longitudinal direction of the information marks 54, and "1" is added to X when an abnormal pixel is detected. Thus, since the CPU 25 and the correlation judging part 35 remove (reject) the pixel shown in FIG. 7, which pixel comprises noises generated during the data transmission and/or dirt and/or spots on the mark sheet. The pixel which is rejected (removed) is regarded as a nonexistent pixel.

On the other hand, if the AS is transmitted to the CPU 25 (in step S9), the CPU 25 resets the address of the border between areas $A_3$ and $A_2$ in the reference address of the address comparator 31 (in step S13). Then the CPU 25 sets the preprocess mode and recognition process mode (in step S14), and thus the preprocess is performed for the area $A_3$ (in step S15). Subsequently, the same procedures in the steps S7 to S12 are executed in steps S16 to S21. That is, the correlation judging part 35 starts to judge correlation (in the step S16), and the CPU 25 stores the address and run length at which the correlation has been judged if the BS is transmitted to the CPU 25 (in the steps S17 to S20). Lastly, the CPU 25 establishes the parameters K and X (in step S21).

If the AS is transmitted to the CPU 25, the CPU 25 resets the address of the end of the line in the reference address of the address comparator 31 (in step S22) and sets only the preprocess mode (in step S23). Then the (right) area $A_2$ is preprocessed to the end of the line (line end) thereof in order to detect the (right) timing marks 53 (in steps S24 and S25). If CS is transmitted to the PIX transmission controller 26, the CPU 25 stores the address and the run length of the pixel by which the CS is generated. The CPU 25 detects an abnormal image by using the address and the run length. If a whole line is preprocessed, the CPU 25 stores the number of the black pixels counted by the black counter 38 and judges the presence of the information marks 54 by means of a table shown in FIG. 8 (in step S26). Hereupon, K0 and K1 in FIG. 8 are respectively a variable threshold. If the CPU 25 judges the line to be "reject", it sets a line reject flag on. If the number of black pixels exceeds a predetermined number, it may be considered that an abnormal image AP3 or AP4 shown in FIG. 9 has been generated. The CPU 25 removes the abnormal image by the line reject flag. The detected timing marks 53 are used for judging the state of the mark sheet 50 and the renewal of the gradient register. The carrying out of the above steps S1 to S26 continues until the end mark 56 is detected (in step S27).

A description will now be given of the procedure for detecting the control mark comprising the start mark 51, gradient correction marks 52, timing marks 53, mode switch mark 55 and end mark 56. As shown in FIG. 11, the start mark has a run length of BR, a line number of Bl, an address of CA and a detecting position T1. Incidentally, the detecting position is used for only the start mark 51.

Figure 12A:
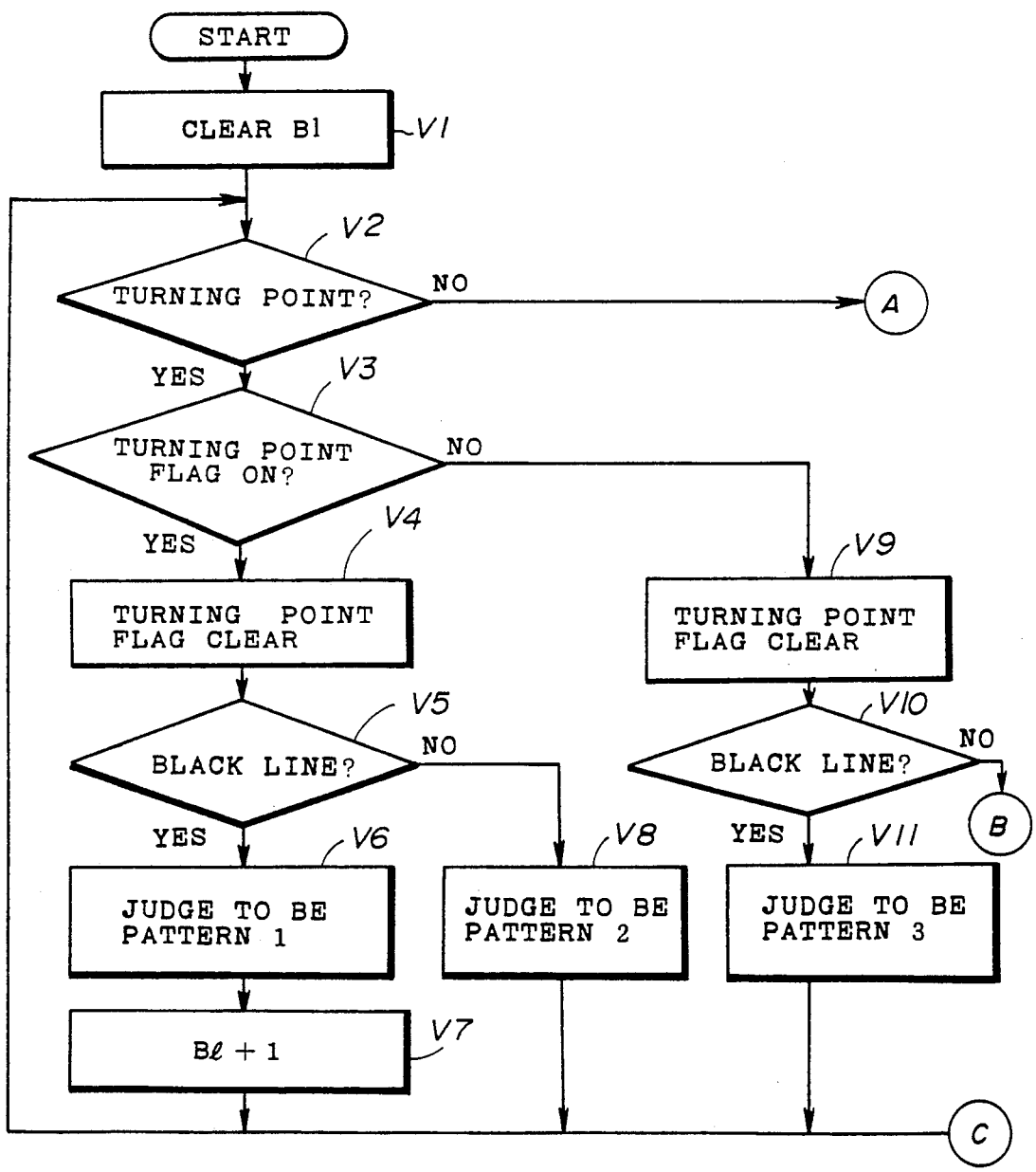

The control mark is often outputted as an abnormal image as shown in FIG. 10 because of chattering or erroneously enlargement or reduction. FIG. 10A shows an abnormal image having pin holes therein. FIG. 10B shows an abnormal image in which one line or more lines are eliminated. FIGS. 10C and 10D show abnormal images in which the uppermost or lowermost line is shifted. According to the present invention, such a control mark outputted as an abnormal image can be recognized by means of compensating the chattering, as shown in FIG. 12. First, the Bl is cleared (in step V1), and whether to not it is a turning point is judged (in step V2). If it is the turning point, whether or not a turning flag is set on is judged (in step V3). If the turning flag is set on, whether or not the line is a black line after the turning flag is cleared is judged (in steps V4 and V5). If the line is a black line, it is regarded as being a pattern 1 shown in FIG. 13A. Incidentally, in FIG. 13, "B" means a black pixel and "W" means a white pixel. The pattern 1 indicates that the control mark is outputted as an abnormal image, as shown in FIG. 10A, 10B and 10D. Then, 1 is added to the Bl, and the procedure is transferred to the step V2 (in step V7).

Figures 13A, 13B, 13C, 13D, 13E, 13F, 13G, 13H:
FIGS. 13A-13H show patterns, one of which is to be selected by the flowchart shown in FIG. 12.

On the other hand, if the line is not judged as being a black line in step V5, it is regarded as being a pattern 2 shown in FIG. 13B. The pattern 2 indicates that the control mark includes one black line among white lines.

If the line is not judged as being the turning point in step V2, the turning point flag is set on (in step V9) and whether or not the line is the black line is judged (in step V10). If it is the black line, it is regarded as being a pattern 3 shown in FIG. 13C (in step V11). The pattern 3 indicates that the control mark includes the turning point from the white line to the black line.

If it is not the black line (in step V10), it is regarded as a pattern 4 shown in FIG. 13D (in step V12). The pattern 4 is generated in a case where the black line is broken off. Then, 1 is added to Bl, and the procedure is transferred to the step V2 (in step V13).

If the line is not judged to be the turning point in step V2, whether or not the turning point flag is set on (in step V14) is judged. If the turning flag is not set on, whether or not it is the black line is judged (in step V15). If it is the black line, it is regarded as being a pattern 5 shown in FIG. 13E (in step V16). The pattern 5 indicates that the control mark is being detected. Then, 1 is added to Bl, and the procedure is transferred to the step V2 (in step V17).

If the line is not judged as being the black line in step V15, it is regarded as being a pattern 6 shown in FIG. 13F (in step V18). The pattern 6 indicates that the white line continues.

On the other hand, if it is judged that the turning point flag is not set on in step V14, the turning point flag is cleared (in step V19), and whether or not it is the black line (in step V20). If it is the black line, it is judged to be a pattern 7 shown in FIG. 13G. The pattern 7 indicates that 2 black lines generate the control mark.

If the line is not judged to be the black line in step V20, it is judged to be a pattern 8 shown in FIG. 13H. The pattern 8 indicates that the control mark is broken off. Then Bl is calculated and the procedure is terminated (in step V23).

Figure 14A:
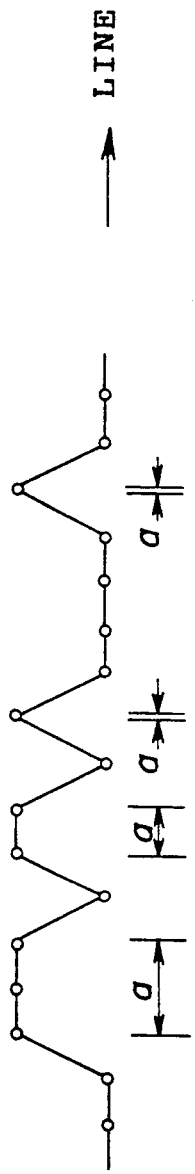
FIGS. 14A-14C show views for explaining how to compensate a chattering.
Figure 14B:
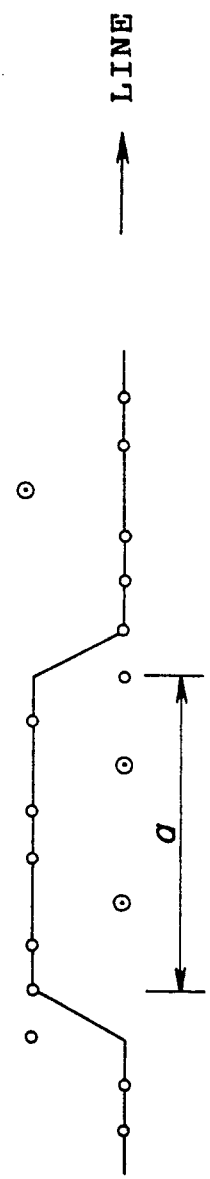
Figure 14C:
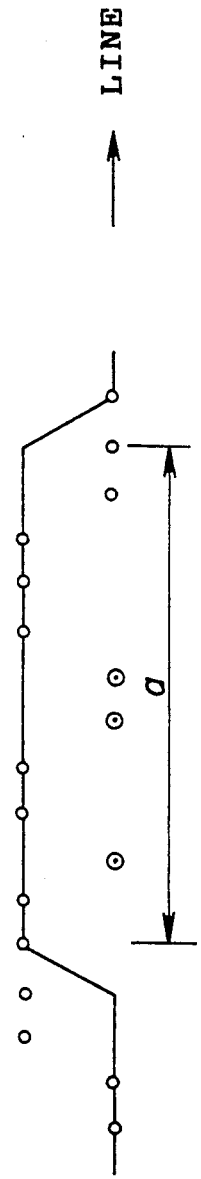

Thus, the chattering can be compensated even if the white line is generated while the control mark is generated. Therefore, a section "a" shown in FIG. 14A, which is regarded as a control mark and where the chattering is not compensated, is made longer, as shown in FIG. 14B in which the chattering is compensated for every line. In addition, if the chattering is compensated for every 2 lines, the section "a" becomes longer as shown in FIG. 14C. Incidentally, ⓒ indicates a line in which the chattering is compensated. Thus, the control mark can be successfully recognized.

Erroneous enlargement or reduction in a longitudinal direction of an image on the mark sheet 50 negatively influences the calculating of the gradient angle of the mark sheet 50 and the determining of an address of each information mark 53 in a transverse direction. According to the present invention, such erroneous enlargement and reduction is corrected.

A description will now be given of how to correct the erroneous enlargement and reduction in the longitudinal direction of an image. The gradient angle is calculated by calculating the initial gradient angle of the mark sheet 50 based on the gradient correction marks 52 and calculating the subsequent gradient angle based on the timing marks 53.

Figures 15, 16:
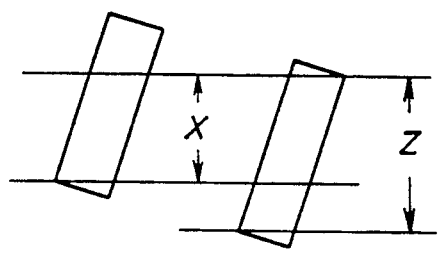
FIGS. 15 and 16 respectively show views for explaining how to correct erroneously enlarged and/or reduced images on the mark sheet shown in FIG. 4.
Figure 17:
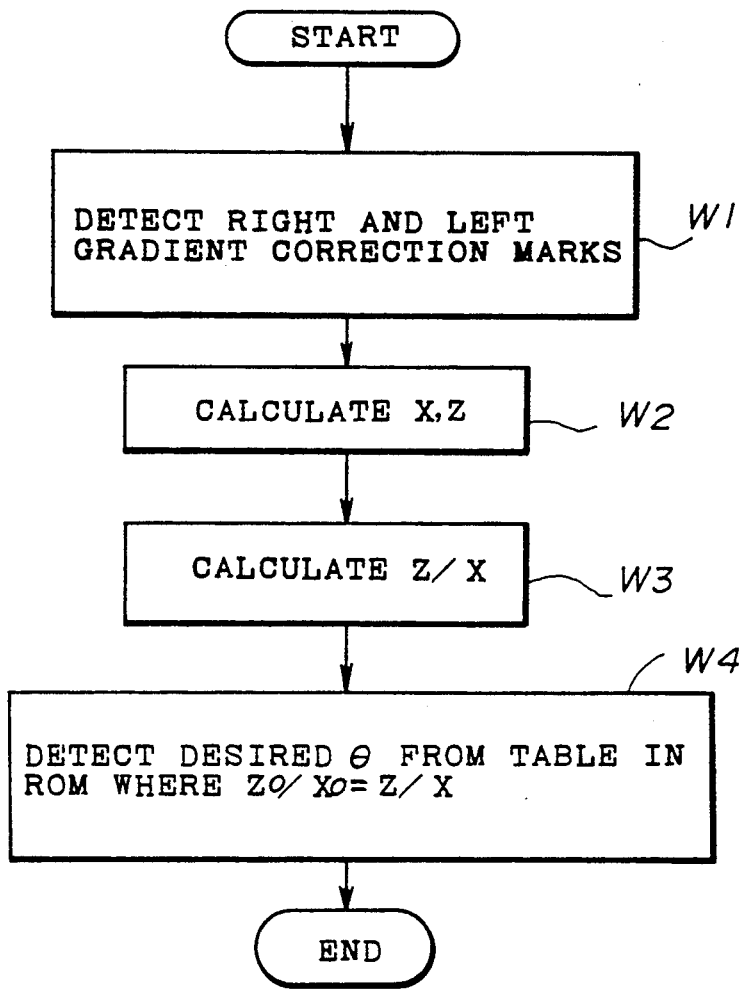
FIG. 17 shows a flowchart executed by the central processing unit shown in FIG. 3 to correct the above erroneous enlargement and/or reduction.

A description will now be given of how to calculate the initial gradient angle of the mark sheet 50. In FIG. 15, $\theta$ denotes a real gradient angle of the mark sheet 50, X denotes the number of lines detected by the right and left gradient correction marks 52, and Z denotes the number of lines detected by the right or left gradient correction marks 52. $X_0$ and $Z_0$ respectively indicate X and Z in a case where there is not erroneous enlargement or reduction. The ROM 23 stores a table shown in FIG. 16 indicating a relationship between $X_0$ and $Z_0$ wherein the line density is 3.85 l/mm and the gradient correction marks 52 each have a length of 16 mm. The ROM 23 also stores a similar table wherein the line density is 7.7 l/mm. As shown in FIG. 17, the gradient angles of the right and left gradient correction marks 52 are continuously detected in order to calculate X and Z (in steps W1 and W2). Then Z/X is calculated (in step W3), and the desired $\theta$ corresponding to $Z_0/X_0$ which is equal to the detected Z/X is detected from the table in ROM 23 (in step W4). According to the conventional method, the gradient angle is calculated by only "X", so that the detected gradient angle includes an error. On the contrary, according to the present invention, the erroneous enlargement and/or reduction in the longitudinal direction of the image is corrected since the gradient angle is calculated by "Z/X". Thus, the initial gradient angle of the mark sheet 50 can be precisely calculated.

A description will now be given of how to calculate the subsequent gradient angle based on the timing marks 53. The subsequent gradient angle may be calculated by the same method as the initial gradient angle. However, it may be calculated by using an enlarging or reducing ratio $K = X/X_0$ based on the result of the initial gradient angle. That is, a real number of lines of the timing marks 53 is converted into an ideal number of lines thereof where $K = 1$ by using the ratio K.

A description will now be given of how to correct the erroneous enlargement and reduction in the transverse direction. The address of each information mark 54 is determined by the distance from the left timing mark 53. Therefore, if there is an erroneous enlargement and/or reduction, a mark is judged to be filled up between the adjacent information marks 54. Accordingly, in the present invention, $l/l_0$ is used for determining the address of each information mark 54, wherein l is a real distance between the right and left timing marks 53 and $l_0$ is an ideal distance therebetween. For example, if the distance between the left timing mark 53 and each of the information marks 54 is 5 mm, the distance between the adjacent information marks 54 is 3 mm, and the width of each of the information mark is 1 mm, and each center position of each of the information mark 54 is calculated by using the $5*l/l_0$, $3*l/l_0$ and $1*l/l_0$. In this embodiment, each information mark 54 having a width of 2 mm, which corresponds to 8 dots, is used. Thus, the information marks 54 can be successfully detected despite the erroneous enlargement and/or the reduction. Incidentally, the correction precision may be in accordance with instructions by Comite Consultatif International Telegraphique et Telephonique (CCITT).

Figure 18A:
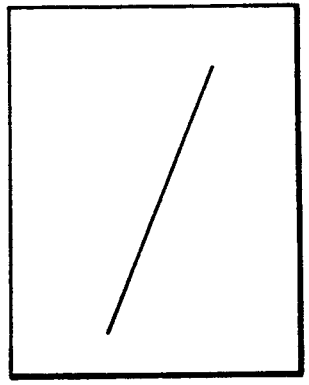
FIGS. 18A and 18B show views for explaining a recirculation process.
Figure 18B:
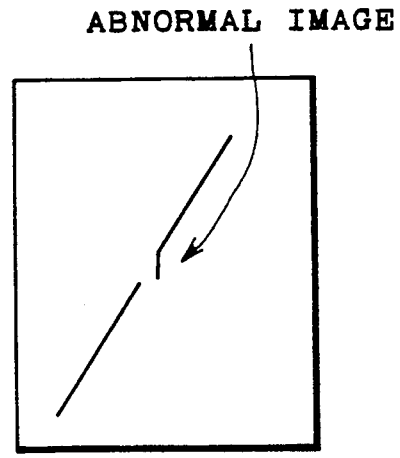

Since the image data transmitted from the one of the FAXs F1 to Fn is sometimes negatively affected by noises generated during the data transmission, the corresponding main interface sometimes erroneously decodes the noises. In the conventional FAX, a so-called recirculation process is used to deal with the erroneously decoded data. However, when the FAX performs the recirculation process, the image which is originally to be outputted as shown in FIG. 18A, is outputted as an abnormal (deformed) image shown in FIG. 18B. Therefore, the recirculation process is not suitable for recognizing the mark sheet 50. Accordingly to the present invention, the erroneous data is not recirculated, but removed. Thus, the noises generated during the data transmission can be successfully removed. In addition, according to the present invention, the thresholds $K_0$ and $X_0$ of the parameters K and X are respectively adjusted so that the mark recognition process cannot be negatively affected by the number of removed lines of the erroneous data. In this case, since too large a number of erroneous lines negatively affects the mark recognition process, the allowable number of erroneous lines is predetermined as shown in FIG. 19 where a normal line density is 3.58 l/mm and an high line density of a fine mode is 7.7 l/mm. In the fine mode, the allowable number of lines and the threshold $K_0$ are each doubled and the allowable number of decoded errors is the same as that in the normal line density. Thus, since the image signal is transmitted to the corresponding mark recognition part by removing the erroneous decoded data and the threshold $K_0$ is adjusted, the mark can be precisely recognized. Needless to say, the thresholds $K_0$ and $X_0$ can be adjusted.

Further, the present invention is not limited to these preferred embodiments, but various variations and modifications may be made without departing from the scope of the present invention.

What is claimed is:

1. An optical mark recognizer comprising:
   interface means, coupled to a line network, for communicating with an external apparatus via the line network and for receiving an image signal therefrom representing a mark sheet in conformity to a predetermined format, the external apparatus generating the image signal consisting of black and white pixel by scanning the mark sheet, the image signal including first and second data, the first data including data of a mark on the mark sheet and data defining the predetermined format of the mark sheet, and the second to data being unnecessary data;
   mark recognition means, coupled to said interface means, for preprocessing the image signal so as to remove the second data, and for recognizing the first data; and
   first control means, coupled to said interface means and said mark recognition means, for controlling operations of said interface means and said mark recognition means, wherein said mark recognition means comprises:
   black counter means for receiving every line of the image signal to detect a number of black pixels included therein;
   second control means, coupled to the black counter means, for preprocessing the image signal so that the second controller omits an arbitrary line of the image signal from an object to be recognized if the number of black pixels included in the arbitrary line is more than a first threshold defined by the predetermined format of the mark sheet;
   first-data recognition means, coupled to the second control means, for recognizing the first data by examining each line of image signal excepting any omitted by the second control means; and
   wherein said mark recognition means further comprises run length counter means, coupled to the second control means, for receiving every line of the image signal to detect a run length of black pixels included therein, and
   wherein the second control means preprocesses the image signal so that the second controller omits an arbitrary line of the image signal from an object to be recognized if the run length of the black pixels included in the arbitrary line is more than a second threshold defined by the predetermined format of the mark sheet, the first-data recognition means recognizing the first data by examining each line of image signal excepting any omitted by the second control means.

2. An optical mark recognizer according to claim 1, wherein said first-data recognition means recognizes an aggregate of the black pixels as the mark on the mark sheet if said aggregate has more than a predetermined scale.

3. An optical mark recognizer according to claim 2, wherein said predetermined scale comprises a 2*2 pixel matrix defined by two adjacent lines of the image signal.

4. An optical mark recognizer according to claim 1, wherein the data defining the predetermined format of the mark sheet is defined by a plurality of control-marks predrawn on the mark sheet, and
   wherein said mark recognition means further comprises memory means, coupled to the first-data recognition means, for storing data of the control-marks, and
   wherein the first-data recognition means recognizes a group of the black pixels as a predetermined control-mark if the group is located at a predetermined address at which the predetermined control-mark in supposed to be located, the predetermined address being stored in the memory means, and if a number of white pixels included in the group in less than a third threshold defined by a scale of the predetermined control-mark.

5. An optical mark recognizer according to claim 1, wherein the data defining the predetermined format of the mark sheet is defined by a plurality of control-marks predrawn on the mark sheet, the plurality of control-marks including a pair of parallel control-marks, and
   wherein said mark recognition means further comprises gradient detecting means, coupled to the first-data recognition means, for detecting a gradient of the mark sheet, the gradient detecting means including:
   first calculating means for calculating how many lines cross the pair of parallel control-marks;
   second calculating means for calculating how many lines cross one of the pair of parallel control-marks; and
   third calculating means, coupled to the first and second calculating means and first-data recognition means, for dividing a result calculated by the first calculating means by a result calculated by the second calculating means, the first-data recognition means recognizing the first data while taking into consideration the gradient of the mark sheet defined by a result calculated the third calculating means.

6. An optical mark recognizer according to claim 1, wherein said mark recognition means further comprises:
   means for detecting enlargement/reduction in a transverse direction, coupled to the first-data recognition means, for detecting a transversal enlargement/reduction representing how enlarged/reduced in a horizontal scanning direction each line of the image signal is; and means for detecting enlargement/reduction in a longitudinal direction. coupled to the first-data recognition means, for detecting a longitudinal enlargement/reduction representing how enlarged/reduced in a vertical scanning direction each line of the image signal is, the first-data recognition means recognizing the first data while taking into consideration the transversal enlargement/reduction detected by the means for detecting enlargement/reduction in a transversal direction and the longitudinal enlargement/reduction detected by the means for detecting enlargement/reduction in a longitudinal direction.

7. An optical mark recognizer according to claim 6, wherein the data defining the predetermined format of the mark sheet is defined by a plurality of control-marks predrawn on the mark sheet, the control-marks including a plurality of timing marks aligned with the vertical scanning direction, each of the timing marks defining a position of each mark, and wherein said mark recognition means further comprises memory means, coupled to the means for detecting enlargement/reduction in a transverse direction, for storing data of the control marks, and wherein said means for detecting enlargement/reduction in a transverse direction detects the transversal enlargement/reduction for each line of the image signal by detecting an address of each timing mark and calculating $k/k_o$ for each timing mark, where k represent an apparent address of each timing mark detected by said means for detecting enlargement/reduction in a transverse direction, and $k_o$ represents a real address of each timing mark stored in the memory means.

8. An optical mark recognizer according to claim 1, wherein the image signal is transmitted, while decoded, from the external apparatus to said optical mark recognizer, and wherein said interface means includes decode means for decoding the image signal transmitted thereto, and wherein said mark recognition means further comprises decode error removing means, coupled to the first-data recognition means, for removing erroneous black pixels if a number of the erroneous black pixels is less than a fourth threshold, each of the erroneous black pixels being generated by mistake while the decode means of said interface means decodes the image signal, and the fourth threshold being determined based on a length of a mark in the vertical scanning direction.

9. An optical mark recognizer according to claim 1, wherein said external apparatus comprises a facsimile apparatus functioning as a mark reader.

10. A method for recognizing an image signal representing a mark sheet in conformity to a predetermined format, the image signal consisting of black and white pixels, the image signal including first and second data, the first data including data of a mark on the mark sheet and data defining the predetermined format of the mark sheet, and the second data being unnecessary data, said method comprising the steps of:

receiving every line of the image signal to detect a number of black pixels included therein;

omitting an arbitrary line of the image signal from an object to be recognized if the number of black pixels included in the arbitrary line is more than a first threshold defined by the predetermined format of the mark sheet;

receiving every line of the image signal to detect a run length of black pixels;

preprocessing the image signals so as to omit arbitrary lines of image signals from an object to be recognized if the run length of black pixels included in an arbitrary line is more than a second threshold determined by a predetermined format of the mark sheet; and recognizing the first data by examining each line of image signal excepting any omitted.

* * * * *